ated July 26, 1960

2,946,747

COMPOSITION FOR CONDITIONING SURFACES CONTAINING CONTAMINATING WATER AND METHOD OF USING THE SAME

Willard H. Kirkpatrick, Sugar Land, and Virgil L. Seale, Houston, Tex., assignors to Visco Products Company, Houston, Tex., a corporation of Delaware No Drawing. Filed Apr. 5, 1955, Ser. No. 499,492

43 Claims. (Cl. 252—8.55)

This invention relates to new and useful chemical compositions, more particularly chemical compositions which are surface active and lower the interfacial tension between oil and water. The invention also relates to chemical compositions which are effective as demulsifying agents for breaking water-in-oil emulsions. It is further concerned with chemical compositions which can be employed for increasing the production of oil and gas wells.

One of the objects of the invention is to provide new and improved surface active chemical compositions.

A further object is to provide new and improved surface active chemical compositions which lower the interfacial tension between oil and water.

An additional object is to provide new and improved surface active chemical compositions which are effective in small amounts for breaking water-in-oil petroleum emulsions.

Another object is to provide new and improved surface active chemical compositions which are substantially soluble in oil.

An additional object is to provide new and improved surface active chemical compositions which are substantially neutral.

Still a further object of the invention is to provide new and improved chemical compositions which are effective for the reconditioning of surfaces that have been contaminated with water or other hydrophilic substances which tend to adhere to said surfaces. This phenomenon can be observed by adding gasoline to a glass bottle, then pouring out the gasoline and adding water, then pouring out the water, thereafter adding an additional quantity of gasoline and pouring it out again. The water forms globules which seem to adhere to the bottle in a random fashion. Further rinsing with gasoline does not remove the water. A similar type of contamination occurs in other containers for oil or hydrophobic liquids which become contaminated with water. In many instances such traces of water are more or less objectionable, sometimes to such an extent as to prevent further use of the container or to require lengthy or expensive reconditioning processes. It is essential for aircraft fuels to remove all traces of water from drums or other containers used in transporting the fuel. Containers used to ship both lubricating oils, gasoline and fuel oils, especially when they are employed for transoceanic shipment, after they have been emptied, are likely to be seriously soiled or contaminated, both inside and outside. It is not uncommon to treat such containers with steam jets and to rinse them with caustic, either with or without preliminary steam heating. In this way it is possible to eliminate practically all of the contamination except the residual water contamination left after the application of the caustic alkali solution or any other aqueous solution. Rinsing of such contaminated containers with a hydrophobic liquid containing a small amount of a chemical composition of the type hereinafter described will remove the water from the contaminated surfaces.

A still further object of the invention is to provide new and useful chemical compositions which when added to a hydrophobic liquid, such as diesel fuel or kerosene or other refined hydrocarbons, introduced into the well bore of an oil or gas well, forced outwardly into the oil or gas well formation, and then released and pumped out of the well, will increase the production of the well. In some instances particularly where the well is to be subjected to a treatment with a hydraulic fracturing fluid the chemical composition is not pumped out of the well but is allowed to remain in contact with the formation and is removed with the fracturing fluid. In areas where fracturing fluids have often caused bad emulsions, the chemical compositions of the present invention are frequently added prior to or following the fracturing fluids and have resulted in increased production of the wells without substantial formation of such emulsions.

In accomplishing the objects of the invention, new and improved chemical compositions have been prepared which can be described generally as surface active modifying agents comprising an oil soluble acido-aryl alkane salt and a synergizing component miscible therewith imparting proper hydrophobe-hydrophile balance to the reagent.

The acido-aryl alkane salt employed for the purpose of the invention is preferably a substantially neutral, at least partially oil soluble amine salt of an aromatic sulfonic acid containing 1 to 5 alkyl groups attached to the aromatic nucleus. The amine employed in neutralizing the sulfonic acid group or groups is preferably a non-aromatic amine, as, for example, an alkyl amine, an aralkyl amine or a cycloalkyl amine. The individual alkyl groups attached to the aromatic nucleus preferably contain not more than nine carbon atoms per alkyl group and the total number of carbon atoms in the alkyl group attached to said aromatic nucleus preferably does not exceed 18 carbon atoms. The minimum number of carbon atoms in the alkyl groups attached to the aromatic nucleus and in the carbon radical or radicals attached to the amino group or groups is that number which will give the resultant sulfo-aryl alkane salt definite oil solubility.

The type of amine employed in neutralizing the sulfonic acid group or groups will depend to some extent upon the kind and number of alkyl groups attached to the aromatic nucleus. For example, if the alkyl groups attached to the aromatic nucleus are methyl or ethyl groups, it might be desirable to neutralize the sulfonic acid group with an alkyl amine containing 12 or more carbon atoms in the alkyl group. On the other hand, if the alkyl groups attached to the aromatic nucleus contain 3 to 9 carbon atoms, it might be desirable to neutralize the sulfonic acid group or groups with a lower alkyl amine such as methylamine or ethylamine. Thus, triethyl naphthalene sulfonic acid could be neutralized with dodecylamine, whereas trihexyl naphthalene sulfonic acid could be neutralized with ethylamine. Excellent results have been obtained with alkyl naphthalene sulfonic acid amine salts in which the alkyl groups attached to the naphthalene nucleus consist of one or more amyl groups, and the carbon radical attached to the amine group is a butyl radical. Good results have been obtained where the aromatic nucleus is substantially mono sulfonated. It will be recognized that the raw material employed can consist of a mixture of alkyl naphthalenes or other alkylated aromatic compounds, preferably mono sulfonated in the aromatic nucleus, neutralized with a non-aromatic amine, preferably one which enhances the oil solubility of the resultant compound. The sulfo group can be present in a side chain (acyclic portion of the molecule) as a sulfonate or sulfate (e.g., $SO_3OX$, where X is an amino group) radical.

In order to impart a proper hydroprobe-hydrophile balance to the reagent, the synergizing component should have the following general properties:

(1) It should be miscible with the oil soluble acidoaryl alkane salt;

(2) It should be capable of accelerating the separation of an aqueous phase from the oil phase of a dispersion of water-in-oil;

(3) It should be capable of reducing surface tension at least approximately 25 dynes per square centimeter when a 1% by weight solution thereof, or a saturated solution provided the water solubility is less than 1%, is added to distilled water and tested in a conventional manner, for example, in a Du Nouy tensiometer;

(4) It must contain polyether linkages; and (5) The molecular weight of the synergizing component attributable to ether groups, e.g., oxyalkylene groups, should preferably be at least 50% by weight of the synergizing component.

The synergizing component of the composition is preferably a substantially surface active agent characterized by at least one oxyalkylene chain and having a molecular weight attributable to the oxyalkylene portion of the molecule of at least 1200, preferably 1500 to 8500. In the preferred composition of the invention the synergizing component has a molecular weight attributable to oxypropylene groups of at least 1200, preferably about 2000 to about 4000, and the oxyalkylene groups constitute a major proportion of the molecular weight. The synergizing component may be, for example, a polyol such as a diol or a triol composed of oxyalkylene groups built up into a large molecule having the requisite aforementioned molecular weight attributable to such groups. The oxyalkylene groups are preferably predominantly oxypropylene groups but the oxyalkylene chain can also contain oxymethylene groups, oxyethylene groups and/or oxybutylene groups. These groups can be present sequentially or in a random order. The oxyalkylene groups can contain side chains such as phenyl groups derived by the employment of styrene oxide.

The solubility of these synergizing components can vary from total water solubility to slight water dispersibility. It is desirable, however, that they be substantially oil soluble.

The invention does not reside in the invention of the synergizing components per se. Many nonionic surface active materials are well known in the art which will function as synergizing components for the purpose of the invention although they have never before been employed for this purpose.

The synergizing components can be condensation products of glycidol, epichlorohydrin, styrene oxide, ethylene oxide, 1,2-propylene oxide and/or 1,2-butylene oxide, as well as other epoxy monomers. A preferred type of nonionic synergizing component for the purpose of the invention is a diol made by building up 1,2-propylene oxide in recurring units to form a polyoxypropylene glycol having a molecular weight of about 2000 and adding to each terminal hydroxy group about 4 mols of ethylene oxide. In other words, the resultant composition contains aproximately 35 mols of 1,2-propylene oxide and 8 mols of ethylene oxide. It is herein referred to as "polyoxypropylene-polyoxyethylene 35–8." Other examples of nonionic synergizing components are the polyoxyalkylene diol made by reacting 4 mols of ethylene oxide with one mol of a polyoxypropylene glycol having a molecular weight of about 2000 (hereinafter referred to as "polyoxypropylene-polyoxyethylene 35–4"), polyoxypropylene glycol having a molecular weight of 2000, polyoxypropylene glycol having a molecular weight of 2700, the heteric diol made by concurrently reacting ethylene glycol or diethylene glycol with ethylene oxide and 1,2-propylene oxide in a weight ratio of 25% ethylene oxide and 75% 1,2-propylene oxide to produce a composition having an average molecular weight of about 2025, and the trihydroxy polyoxyethylated-polyoxypropylated glycerine made by first reacting 1,2-propylene oxide with glycerine in a weight ratio of from 40 to 70 parts by weight of 1,2-propylene oxide per part by weight of glycerine to form a polyoxypropylated glycerine base material, and then reacting ethylene oxide therewith until from 0.44 to 0.65 part by weight of the ethylene oxide is reacted per part by weight of the polyoxypropylated base material.

The synergizing component can be a derivative of any of the aforementioned polyols as, for example, an ether, an ester or an acidic ester. The ethers are compounds in which the terminal hydroxyl group is substituted by a terminal ether group as, for example, methoxy, ethoxy, propoxy or butoxy. The esters are compounds in which a terminal hydroxyl group is reacted with an acid as, for example, an organic carboxy acid, to form an ester group. The acid can be a monobasic acid such as a fatty acid (e.g., acetic acid, 2-ethylhexanoic acid, lauric acid, palmitic acid, oleic acid, ricinoleic acd, linoleic acid, or other saturated or unsaturated fatty acid). The acid can also be a polybasic acid such as a polycarboxy acid in which case one or more carboxyl groups can be esterified. If less than the total number of free carboxyl groups are esterified, the resultant compound is referred to herein as an acidic ester. Examples of polycarboxy acids which can be employed to esterify the polyols in order to produce esters and/or acidic esters are diglycolic acid, maleic anhydride, phthalic anhydride, terephthalic acid, citric acid, the long chain high molecular weight polycarboxy acids derived by the dry distillation of castor oil in the presence of an alkali (e.g., VR–1 acid), dilinoleic acid (Emery dimer acid, Hardesty 401).

Specific examples of such synergizing components which are ethers are the monobutylether of polyoxypropylene glycol having a molecular weight of about 1700 (Ucon LH–620), the monobutylether of a heteric polyoxyalkylene diol made from approximately equal weight proportions of ethylene oxide and 1,2-propylene oxide and having a molecular weight of about 3500 (Ucon 50 HB–3520), the monobutylether of a heteric polyoxyalkylene diol made from equal parts by weight of ethylene oxide and 1,2-propylene oxide and having a molecular wieght of about 5100 (Ucon 50 HB–5100). The corresponding dibutylethers of said compounds are illustrative of the diethers which can be employed as synergizing components for the purpose of the invention.

Specific examples of esters and acidic esters of the type described are the maleic, phthalic, and diglycolic esters and acidic esters of polyoxypropylene glycol 2000, the maleic, phthalic and diglycolic esters and acidic esters of polyoxypropylene glycol 2700, maleic, phthalic and diglycolic esters and acidic esters of polyoxypropylene glycol 4000, the maleic, phthalic and diglycolic esters and acidic esters of polyoxypropylene-polyoxyethylene 35–8, the maleic, phthalic and diglycolic esters and acidic esters of polyoxypropylene-polyoxyethylene 35–4, and the maleic, phthalic and diglycolic esters and acidic esters of oxyethylated-oxypropylated glycerine containing at least 27 and not more than 42 oxy-1,2-propylene groups, and at least 14 and not more than 45 oxyethylene groups per mol of glycerine.

The synergizing component can also be other oxyalkylated hydrophobic materials having the requisite properties previously enumerated, such as, for example:

(1) Oxyalkylated fatty oils
(2) Oxyalkylated oxidized fatty oils
(3) Oxyalkylated sulfurized fatty oils
(4) Oxyalkylated marine oils
(5) Oxyalkylated oxidized marine oils
(6) Oxyalkylated sulfurized marine oils
(7) Oxyalkylated oxidized mineral oils
(8) Oxyalkylated phenol-formaldehyde resins (9) Oxyalkylated amine-modified phenol formaldehyde resins
(10) Oxyalkylated urea-formaldehyde resins
(11) Oxyalkylated melamine-formaldehyde resins
(12) Oxyalkylated arylamine-formaldehyde resins
(13) Oxyalkylated aliphatic amine-formaldehyde resins
(14) Oxyalkylated polybasic acid-polyhydric alcohol resins
(15) Oxyalkylated oil-modified polybasic acid-polyhydric alcohol resins
(16) Oxyalkylated polyacrylic acid resins
(17) Oxyalkylated polymethacrylic acid resins Specific examples of oxyalkylated hydrophobic materials of the type previously described are:

(1) Oxyethylated castor oil made by the oxyethylation of castor oil with 15 to 45 mols of ethylene oxide per mol of castor oil.

(2) Oxyethylated blown castor oil made by the oxyethylation of blown castor oil with 15 to 45 mols of ethylene oxide per mol of castor oil.

(3) The diglycolic, phthalic and dilinoleic acid (or other polymer acid) esters of oxyethylated castor oil oxyethylated with 15 to 45 mols of ethylene oxide per mol of castor oil, in which the ratio of polycarboxy acid to fatty oil is in the range from 1 to 6 mols of polycarboxy acid per mol of fatty oil.

(4) The product obtained by oxyethylating a phenol-formaldehyde resin resulting from heating 1000 parts of crude alkyl phenol containing 85% to 90% nonyl phenol and 10 to 15% dinonyl phenol, 150 parts p-formaldehyde containing 10% water, and 2 parts of sulfamic acid in 10 parts water for 3 hours at 95° C. to 105° C., then an additional 2 hours at 103° C. to 105° C. to remove 22 parts of water, adding 400 parts of $SO_2$ extract at 100° C. and continuing the heating for 2 hours until a total of 104 parts of water has been removed, the oxyethylation being effected by adding 440 parts of ethylene oxide to 400 parts of the resultant resin, exclusive of the $SO_2$ extract used as a solvent.

(5) The product obtained as in (4) using 20 parts of sulfamic acid instead of 2 parts.

(6) The product obtained as in (4) using 880 parts of ethylene oxide instead of 440 parts.

(7) The product obtained by heating together 750 parts of the crude alkylated phenol used in (4), 100 parts of p-formaldehyde, and 2 parts of powdered caustic soda to 60° C., then removing the heat and allowing the temperature to rise slowly to 110° C. for 2 hours, adding 250 parts of $SO_2$ extract, heating from 110° C. to 150° C. for 1 hour while removing 49 parts of water, adding 200 parts of polyamine H Special, a still residue from the manufacture of diethylene triamine consisting essentially of higher polyethylene polyamines to which 25% by weight of diethylene triamine has been added, at 35° C., heating an additional 3 hours to raise the temperature from 134° C. to 214° C. while removing about 14 parts of water, adding 250 parts of $SO_2$ extract at 150° C., stirring to uniformity and oxyethylating with 440 parts of ethylene oxide per 400 parts of the resultant resin, exclusive of the $SO_2$ extract used as a solvent.

In the foregoing specific examples, the quantity of ethylene oxide corresponds to about ⅔ part by weight to 2 parts by weight of ethylene oxide for each part by weight of the hydrophobic material which is oxyethylated. Thus, castor oil has a molecular weight of about 983 and 15 moles of ethylene oxide has a molecular weight of 660 which is approximately ⅔ of the weight of the castor oil. 45 moles of ethylene oxide has a molecular weight of 1980 which is approximately twice the weight of the castor oil. In the oxyethylated phenol-formaldehyde resin the weight ratio of ethylene oxide to resin is slightly more than 1:1 in one instance and slightly more than 2:1 in the other.

The proportions of the acido-aryl alkane salt and of the synergizing component in the composition will vary somewhat, depending upon the specific materials employed but in general the acido-aryl alkane salt will always constitute a predominating proportion of the composition, exclusive of solvents. On the basis of the total weight of the acido-aryl alkane salt and the synergizing component, the acido-aryl alkane salt will ordinarily be from 3 to 20 times by weight of the synergizing component. Within this range, if the synergizing component is a polyol or an ether of a polyol, the amounts of such component employed will normally be relatively larger with respect to the acido-aryl alkane salt than when the synergizing component is an ester or an acidic ester of a polyol of the type previously described.

The invention will be illustrated but is not limited by the following examples in which the quantities are stated in parts by weight unless otherwise indicated.

*Example I*

600 parts of a polydodecyl benzene sulfonic acid known as Bryton sulfonic acid are placed in a reaction vessel and 122 parts of butylamine are added thereto slowly so that the heat of reaction does not raise the temperature of the reaction mixture above 80° C. 100 parts of 99% isopropanol are added to give the final product. This product is then mixed with a polyether material as described in later examples.

*Example II*

607 parts of polydodecyl benzene sulfonic acid known as Bryton sulfonic acid are placed in a reaction vessel and 129 parts of cyclohexylamine are added slowly thereto while keeping the reaction temperature below about 80° C. 100 parts of 99% isopropanol are then added to the reaction mixture to give a final product consisting essentially of the cyclohexylamine salt of polydodecyl benzene sulfonic acid. This product is mixed with a polyether material as described in subsequent examples.

*Example III*

600 parts of monodecyl benzene sulfonic acid are mixed with 100 parts of $SO_2$ extract and 232 parts of n-butylamine are slowly added to the resultant mixture, the rate of addition being such as to keep the temperature of the reaction mixture below about 80° C. in order not to boil off the free amine. 100 parts of 99% isopropanol are then added to the resultant solution to give a product which is mixed with a polyether material as described in subsequent examples.

*Example IV*

600 parts of monodecyl benzene sulfonic acid are mixed with 400 parts of $SO_2$ extract and 258 parts of cyclohexylamine are added slowly to the resultant mixture to form the cyclohexylamine salt of the monodecyl benzene sulfonic acid. 100 parts of 99% isopropanol are then added to the resultant product to produce a material which is subsequently mixed with a polyether as hereinafter described.

*Example V*

600 parts of monodecyl benzene sulfonic acid are placed in a reaction vessel and 258 parts of cyclohexylamine are added slowly at a rate sufficient to maintain the temperature below about 80° C. The resultant cyclohexylamine salt of the sulfonic acid is mixed with 300 parts of $SO_2$ extract and the product is mixed with a monoether material as described in subsequent examples.

*Example VI*

300 parts of monodecyl benzene sulfonic acid are mixed with 200 parts of $SO_2$ extract and 237 parts of a mixture of alkyl pyridines is added thereto, the rate of addition being such as to maintain the temperature below about 80° C. The alkyl pyridines used in this example are the residue product from the production of 2-methyl-5-ethyl pyridine by the reaction of ammonia and acetaldehyde. The resultant alkyl pyridine salt of monodecyl benzene sulfonic acid dissolved in $SO_2$ extract is mixed with 50 parts of 99% isopropanol. The resultant product is subsequently mixed with a polyether material as hereinafter described.

*Example VII*

(a) 650 parts of a mixture of mono- and di-nonyl naphthalenes (Neolene 212) are placed in a reaction vessel and 600 parts of 98% sulfuric acid are slowly added thereto intermittently so that the temperature of the reaction mixture does not exceed 60° C. When all of the acid has been added, the temperature is held at 60° C. for one hour. 400 parts of water are added slowly to the mixture, the resultant mixture stirred for 30 minutes, the temperature raised to 90° C., and the product transferred to a separatory funnel to stratify. The aqueous acid layer is removed and 300 parts of $SO_2$ extract are added to the sulfonated alkyl naphthalene mixture.

(b) 400 parts of the sulfonated alkyl naphthalenes prepared as in Example (a) are placed in a reaction vessel and 76 parts of n-butylamine are added slowly thereto at a rate sufficient to maintain the temperature below about 80° C. 200 parts of $SO_2$ extract are then added to the resultant amine salt and the product is subsequently mixed with a polyether material as hereinafter described.

(c) 400 parts of the sulfonated alkyl naphthalenes prepared as in (a) are placed in a reaction vessel and 82 parts of cyclohexylamine are added slowly at a rate sufficient to keep the temperature of the reaction mixture below about 80° C. The resultant butylamine salt of the mono- and di-nonyl naphthalene sulfonate is then mixed with 250 parts of $SO_2$ extract and the product obtained is mixed with a polyether material, as described in subsequent examples.

(d) 400 parts of the product prepared as in (a) is placed in a reaction vessel and 135 parts of the alkyl pyridine residue described in Example VI are added thereto at a rate such that the temperature of the reaction mixture does not rise above about 80° C. The resultant alkyl pyridine salt of the mono- and di-nonyl naphthalenes is then mixed with 250 parts of $SO_2$ extract and the product obtained is mixed with a polyether material, as described in subsequent examples.

*Example VIII*

400 parts of monoamyl naphthalene are placed in a reaction vessel and 600 parts of 98% sulfuric acid are added thereto slowly while maintaining a temperature below 60° C. After the addition is complete, the temperature is raised to 60° C. and held for one hour. At the end of this time, 300 parts of wash water are slowly added and the reaction mixture stirred for 30 minutes. The temperature is then raised to 90° C. and the mixture is transferred to a separatory funnel to stratify. The aqueous acid solution is removed and the layer of monoamyl naphthalene sulfonic acid is neutralized by slowly adding thereto 239 parts of n-butylamine at a rate such that the heat of reaction does not rise above about 80° C. The resultant butylamine salt of the monoamyl naphthalene sulfonic acid is mixed with a monoether material, as described in subsequent examples.

*Example IX*

(a) An alkyl naphthalene sulfonic acid mixture is prepared by charging 4000 parts of a mixture of amyl naphthalenes consisting of 15 to 20% monoamyl naphthalene and the remainder substantially diamyl and other polyamyl naphthalenes into a sulfonator, and adding 4000 parts of 98% sulfuric acid intermittently so that the temperature of the reaction mixture does not exceed 60° C. during the addition. When all of the sulfuric acid is added, the temperature is held at 60° C. for a period not to exceed 90 minutes to complete the sulfonation. The resultant product is essentially a monosulfonated mixture of monoamyl and diamyl naphthalenes containing minor amounts of other amyl naphthalenes.

(b) 1200 parts of the sulfonic acid prepared as described in (a) is washed with 400 parts of wash water by stirring the water with the sulfonic acid mixture for 30 minutes at 60° C. The temperature is then raised to 90° C. and the acid wash water is removed by stratification and separation in a separatory funnel. 869 parts of the resultant sulfonic acid is neutralized with 270 parts of n-butylamine. The resultant amine salt is mixed with a polyether material as described in subsequent examples.

The following examples illustrate the preparation of solutions of synergizing agents which are mixed with the solutions of acido-aryl alkane salts described in Examples I to IX.

*Example X*

(a) One part of glycerine is charged into a reactor and .13 part of sodium hydroxide is added. Then 51 parts of 1,2-propylene oxide are added at a temperature of 120° C. to 135° C. under a pressure of 50 to 60 pounds per square inch gauge. To each part of the resultant oxypropylated glycerine 0.6 part of ethylene oxide is added at a temperature of 120° C. to 160° C. under a pressure of 50 to 60 pounds per square inch gauge. The resultant material has an average molecular weight of about 4000 to 4500 and is soluble in water in all proportions. It is also oil soluble in most proportions.

(b) 100 parts of the oxyethylated-oxypropylated glycerine prepared as described in (a) is mixed with 175 parts of $SO_2$ extract and the mixture stirred to uniformity at room temperature (about 75° F.). The resultant solution is suitable for use as a synergizing component and can be mixed with any of the solutions of acido-aryl alkane salts described in Examples I to IX, preferably in proportions such that the solution of the synergizing component is 5%, 10% or 20% by volume of the resultant composition. The final compositions containing the acido-aryl alkane salt and the synergizing component are suitable for any of the purposes herein described.

*Example XI*

(a) A synergizing component is prepared by oxyethylating 1 mol of a polyoxypropylene glycol having a molecular weight of about 2000 with 12 mols of ethylene oxide. 300 parts of this synergizing component is dissolved in 525 parts of $SO_2$ extract and the resultant mixture is stirred to uniformity at room temperature to give a solvent-adjusted synergizing component.

(b) The adjusted solution of the synergizing component is mixed with any of the acido-aryl alkane salt solutions described in Examples I to IX in proportions such that the volume of the adjusted solution of the synergizing component constitutes 5%, 10% or 20% of the total volume. The resultant composition is suitable for any of the uses herein described.

*Example XII*

(a) The procedure is the same as that described in Example XI except that the synergizing component is made by oxyethylating the polyoxypropylene glycol having a molecular weight of about 2000 with 8 mols of ethylene oxide instead of 12 mols, thereby producing an oxyethylated polyoxypropylene glycol containing a central portion derived from about 35 mols of 1,2-propylene oxide and two terminal portions each derived from about 4 mols of ethylene oxide.

*Example XIII*

The procedure is the same as Example XI except that polyoxypropylene-polyoxyethylene 35-4 is employed as the synergizing component.

Example XIV 300 parts of polyoxypropylene glycol having a molecular weight of approximately 2000 is mixed with 525 parts of $SO_2$ extract and the mixture stirred to uniformity at room temperature. The resultant solution is employed as a synergizing component by mixing it with any of the solutions of acido-aryl alkane amine salts described in Examples I to IX in proportions such that 5%, 10% or 20% by volume of the resultant mixture is the adjusted solution of the synergizing component. The resultant solutions can be employed for any of the purposes herein described.

Example XV 150 parts of the oxyethylated-oxypropylated glycerine described in Example X is mixed with 150 parts of methanol. 150 parts of water are then added and the resultant solution is employed as a synergizing component by mixing it with any of the solutions of acido-aryl alkane salts described in Examples I to IX in proportions such that the solution of the synergizing component is 5%, 10% or 20% by volume of the total volume of the resultant composition. These compositions can be employed for any of the purposes herein described.

Example XVI 150 parts of polyoxypropylene-polyoxyethylene 35–8 are mixed with 150 parts of methanol and 150 parts of water. The resultant mixture is stirred to uniformity at room temperature. The adjusted solution of the synergizing component is mixed with any of the solutions of the acido-aryl alkane salts described in Examples I to IX in proportions such that the solution of the adjusted synergizing component is 5%, 10% or 20% by volume of the resultant mixture. The final homogeneous solution can be used for any of the purposes herein described.

Example XVII (a) 4650 parts of the monobutylether of a heteric polyoxyethylene-polyoxypropylene glycol having a molecular weight of approximately 1700 and containing approximately equal parts of ethylene oxide and 1,2-propylene oxide are reacted with 800 parts of phthalic anhydride in a stainless steel processing vessel heated to 155° C. and maintained at that temperature for 5 hours. 9360 parts of $SO_2$ extract are added to the resultant acidic ester to yield an adjusted solution of the synergizing component.

(b) The adjusted solution of the synergizing component is mixed with any of the solutions of the acido-aryl alkane salts described in Examples I to IX in proportions such that the adjusted solution of the synergizing component constitutes 5%, 10% or 20% by volume of the final product. The resultant composition is suitable for any of the purposes herein described.

Example XVIII (a) 6750 parts of polyoxypropylene glycol having a molecular weight of approximately 2000 are mixed with 950 parts of diglycolic acid, 720 parts of $SO_2$ extract and heated to remove about 133 parts of an aqueous distillate. The distillate begins to appear at about 170° C. and the required amount is secured at a final temperature of about 240° C. The resultant product is then mixed with 2750 parts of $SO_2$ extract and 715 parts 99% isopropanol. The product is cooled to about 135° C. before the addition of the 2750 parts of $SO_2$ extract and to 95° C. before the addition of the isopropanol.

(b) The resultant solution is suitable for use as a synergizing component and is mixed with any of the acido-aryl alkane salt solutions described in Examples I to IX in proportions such that the final composition contains about 2% to 15% by volume of the synergizing component.

Example XIX (a) The procedure is the same as that described in Example XVIII except that the diglycolic ester of the polyoxypropylene glycol is prepared by using 4050 parts of the polyoxypropylene glycol having a molecular weight of about 2000, 500 parts of diglycolic acid and 750 parts of $SO_2$ extract. The mixture is heated to remove about 83 parts of an aqueous distillate at a final temperature around 240° C. to 260° C. The resultant mixture after cooling to 150° C. is mixed with 6400 parts of $SO_2$ extract and after further cooling to 95° C. 1425 parts of 99% isopropanol are added.

(b) The final composition is mixed with any of the solutions of the acido-aryl alkane salts described in Examples I to IX in proportions such that the adjusted solution of the synergizing component constitutes 2% to 15% by volume of the total volume of the resultant composition. The final composition is suitable for any of the purposes herein described.

Example XX (a) 3200 parts of Ucon 50 HB 5100 are mixed with 80 parts of maleic anhydride and 750 parts of $SO_2$ extract. The mixture is heated at 155° C. to 165° C. for 4 hours with agitation and 7800 parts of $SO_2$ extract are added.

(b) The resultant solution of the synergizing component which consists of a maleic ester of a monobutylether of a heteric polyoxyethylene-polyoxypropylene diol containing approximately equal parts of ethylene oxide and 1,2-propylene oxide and having a molecular weight of about 5100 is mixed with solutions of any of the acido-aryl alkane salts described in Examples I to IX in proportions such that the adjusted solution of the synergizing component constitutes 2% to 15% by volume of the final composition. The final composition is suitable for any of the purposes herein described.

Example XXI (a) 4050 parts of polyoxypropylene glycol having a molecular weight of about 2000 are mixed with 720 parts of phthalic anhydride and heated for 12 hours at 200 to 220° C. The reaction mixture is cooled to 140° C. and 6480 parts of $SO_2$ extract are added. After further cooling to approximately 95° C., 1430 parts of 99% isopropanol are added. The resultant composition is mixed with any of the solutions of the acido-aryl alkane salts described in Examples I to IX in proportions such that 2% to 15% by volume of the final composition is the solvent solution of the phthalic ester of the polyoxypropylene glycol. The final composition is suitable for any of the purposes herein described.

Example XXII

The synergizing component is prepared by esterifying 1 mol of polyoxypropylene-polyoxyethylene 35–4 with 2 mols of diglycolic acid so that both of the terminal hydroxyl groups of the diol are esterified leaving free carboxyl groups attached to the diglycolic portion of the molecule. 300 parts of the resultant product are dissolved in 525 parts of $SO_2$ extract and stirred to uniformity at room temperature. The resultant composition is then mixed with any of the solutions previously described in Examples I to IX in proportions such that the adjusted solution of the diglycolic ester of the polyether derivative constitutes about 2% to 15% by volume of the final product. This product is suitable for any of the uses herein described.

Example XXIII

The procedure is the same as in Example XXII except that equivalent quantities of maleic anhydride are substituted for the diglycolic acid.

Example XXIV

The procedure is the same as in Example XXII except that equivalent quantities of polyoxypropylene-polyoxyethylene 35–8 are substituted for the polyoxypropylene-polyoxyethylene 35–4.

Example XXV

The procedure is the same as in Example XXIV except that maleic anhydride is substituted for diglycolic acid in equivalent amounts.

The following specific examples are given to illustrate specific preferred combinations of the acido-aryl alkane salt and the synergizing component.

Example XXVI 225 parts by volume of the solution of the acido-aryl alkane salt prepared as described in Example IX are mixed with 25 parts by volume of the solvent-adjusted solution of the synergizing component described in Example X and the mixture is stirred to uniformity at a temperature around 75° F.

Example XXVII 225 parts by volume of the solution of the acido-aryl alkane salt prepared as described in Example IX are mixed with 25 parts by volume of the solvent-adjusted solution of the synergizing component described in Example XI and stirred to uniformity at a temperature around 75° F.

Example XXVIII 225 parts by volume of the solution of the acido-aryl alkane salt prepared as described in Example IX are mixed with 25 parts by volume of the solution of the synergizing component described in Example XII and the mixture is stirred to uniformity at room temperature.

Example XXIX 225 parts by volume of the solution of the acido-aryl alkane salt prepared as described in Example IX are mixed with 25 parts by volume of the solution of the synergizing component described in Example XIII and the mixture is stirred to uniformity at room temperature.

Example XXX 225 parts by volume of the solution of the acido-aryl alkane salt prepared as described in Example IX are mixed with 25 parts by volume of the solution of the synergizing component described in Example XIV and the mixture is stirred to uniformity at room temperature.

Example XXXI 225 parts by volume of the solution of the acido-aryl alkane salt prepared as described in Example IX are mixed with 75 parts by volume of the solution of the synergizing component described in Example X and the mixture is stirred to uniformity at room temperature.

Example XXXII 225 parts by volume of the solution of the acido-aryl alkane salt prepared as described in Example IX are mixed with 75 parts by volume of the solution of the synergizing component described in Example XI and the mixture is stirred to uniformity at room temperature.

Example XXXIII 225 parts by volume of the solution of the acido-aryl alkane salt prepared as described in Example IX are mixed with 75 parts by volume of the solution of the synergizing component described in Example XII and the mixture is stirred to uniformity at room temperature.

Example XXXIV 225 parts by volume of the solution of the acido-aryl alkane salt prepared as described in Example IX are mixed with 75 parts by volume of the solution of the synergizing component described in Example XIII and the mixture is stirred to uniformity at room temperature.

Example XXXV 225 parts by volume of the solution of the acido-aryl alkane salt prepared as described in Example IX are mixed with 75 parts by volume of the solution of the synergizing component described in Example XIV and the mixture is stirred to uniformity at room temperature.

Example XXXVI 90 parts by volume of the solution of the acido-aryl alkane salt prepared as described in Example VII(a) are mixed with 10 parts by volume of the solution of the synergizing component described in Example X and the mixture is stirred to uniformity at room temperature.

Example XXXVII

The procedure is the same as that described in Example XXXVI except that 75 parts by volume of the solution of the acido-aryl alkane salt prepared as described in Example VII(a) are mixed with 25 parts by volume of the solution of the synergizing component prepared as described in Example X.

Example XXXVIII 45 parts by volume of the solution of the acido-aryl alkane salt prepared as described in Example VII(a) are mixed with 5 parts by volume of the solution of the synergizing component prepared as described in Example XI and the mixture stirred to uniformity at room temperature.

Example XXXIX

The procedure is the same as that described in Example XXXVIII except that 37.5 parts by volume of the solution of the acido-aryl alkane salt prepared as described in Example VII(a) are mixed with 12.5 parts of the solution of the synergizing component of Example XI, and the mixture stirred to uniformity at room temperature.

Example XL 45 parts by volume of the solution of the acido-aryl alkane salt prepared as described in Example VII(a) are mixed with 5 parts by volume of the solution of the synergizing component prepared as described in Example XII and the mixture stirred to uniformity at room temperature.

Example XLI

The procedure is the same as that described in Example XL except that the respective amounts of the solutions of the acido-aryl alkane salt and the synergizing component are 37.5 and 12.5 parts by volume.

Example XLII 45 parts by volume of the solution of the acido-aryl alkane salt described in Example VII(a) are mixed with 5 parts by volume of the solution of the synergizing component described in Example XIII and the mixture stirred to uniformity at room temperature.

Example XLIII

The procedure is the same as that described in Example XLII except that the respective amounts of the solutions of the acido-aryl alkane salt and the synergizing component are 37.5 and 12.5 parts by volume.

Example XLIV 45 parts by volume of the solution of the acido-aryl alkane salt prepared as described in Example VII(a) are mixed with 5 parts by volume of the solution of the synergizing component prepared as described in Example XIV and the mixture stirred to uniformity at room temperature.

Example XLV

The procedure is the same as that described in Example XLIV except that the respective amounts of the solution of the acido-aryl alkane salt and the solution of the synergizing component are 37.5 and 12.5 parts by volume.

Example XLVI

This example illustrates the best mode contemplated for utilizing the compositions containing an acido-aryl alkane salt and a synergizing component as described in the previous examples.

The finished composition of any of the Examples X to XLV, inclusive, is mixed with diesel fuel, kerosene or light crude oils in the ratio of 1 gallon of the composition to 2 barrels (42 gallons to the barrel) of the diesel fuel, kerosene, other refined hydrocarbons, or naturally occurring crude oils. The resultant fluid mixture is then pumped into an oil well with the volume of oil displacement varying to fit the particular situation. The ratio of 1 gallon of the composition to 2 barrels of diesel fuel, kerosene or crude oil for each foot of formation can generally be used. The diesel fuel, kerosene or crude oil containing the composition is allowed to remain in the well usually for a relatively short period of time, as, for example, for a period from 1 to 2 hours. Production from the well is then renewed. This treatment greatly improves the recovery of oil from producing wells.

The compositions of the invention are also especially useful for addition to oil and gas wells ahead of a refined oil used in fracturing the well. Furthermore, after a well has become blocked by an emulsion as the result of a refined oil fracturing, a treatment of the well with compositions of the invention can be used to cause the well to produce again. The compositions of the invention are also useful in treating wells after the wells have been treated with a raw acid. Such acid treatment sometimes blocks all fluid production and treatment with compositions of the invention will remove the emulsion block and permit a rapid recovery of the spent acid to give a good producing well.

Where a well is completed with an oil base mud and is treated with an acid a very thick emulsion sometimes forms which blocks the flow of all fluids. A treatment using compositions of the invention can be employed, followed by a refined oil fracturing treatment, to clean up the well very quickly and remove the emulsion.

The compositions of the invention can also be employed in conjunction with diesel oil-cement squeezes. Past history has shown that reperforation and acid treatment of wells are necessary to regain oil production after these squeezes. By treating the well with a composition of the present invention prior to the addition of the diesel oil-cement slurry, the water is removed from the oil zone so that no cement is set at that point. The use of the compositions of the invention, therefore, makes it possible to carry out a diesel oil-cement squeeze without reperforation and acid treatment.

The compositions of the present invention are also especially useful in the after treatment of wells which has previously been treated to remove drilling muds. The treatment with compositions of the invention serves to reduce interstitial water concentration.

In the examples, the $SO_2$ extract is a by-product from the Edeleanu process of refining petroleum in which the undesirable fractions are removed by extraction with sulfur dioxide. After removal of the sulfur dioxide a mixture of hydrocarbons, substantially aromatic in character, remains and this mixture is designated in the trade as $SO_2$ extract.

In order to determine whether the synergizing component is capable of accelerating the separation of the aqueous phase from the oil phase of a dispersion of water in oil, an effective test is to add varying proportions of the acido-aryl alkane salt and varying proportions of a given composition containing the acido-aryl alkane salt and synergizing component to a predetermined quantity of a dispersion of water in oil. Thus, to 100 cc. of a given dispersion of water in oil containing 40 parts of water, the proportions of the compositions of the invention which would be added are, for example, 0.1 cc., 0.2 cc., 0.3 cc., 0.5 cc., 1 cc., 2 cc., 5 cc. and 10 cc. By adding the acido-aryl alkane salt alone and comparing the result with the mixture of the acido-aryl alkane salt and the synergizing component, the acceleration of the separation of the aqueous phase from the oil phase can readily be observed.

The surface tension lowering characteristics of the synergizing component can readily be determined using a Du Nouy tensiometer. For example, under a given set of conditions at a temperature of about 80–85° F., the following observations were made using a Du Nouy tensiometer, which gave a reading of 76.2 dynes per square centimeter for distilled water. Ordinarily the reading for distilled water on a correctly calibrated instrument is considered to be around 72, but inasmuch as the present observations are concerned only with the lowering of the surface tension, the extent to which the surface tension is lowered will be aproximately the same regardless of the zero calibration of the instrument. These observations were made with 1% solutions in distilled water of the materials tested except in those cases where the solubility was less than 1%, and in such instances a saturated solution was used. Each solution was allowed to attain equilibrium.

| Material tested: | Surface tension reading in dynes per square centimeter |
|---|---|
| 1% Carbowax 10,000 | 60 |
| 1% Carbowax 6000 | 61 |
| 1% Carbowax 1540 | 60.5 |
| 1% composition of Example X(a) | 32 |
| 1% of a heteric polyoxyalkylated glycerine containing equal amounts of ethylene oxide and 1,2-propylene oxide having a molecular weight of approximately 2400 (polyglycol 15–200) | 51 |
| 1% polyglycol 19–200 | 44 |
| Saturated solution polyoxypropylene glycol 2000 | 44.1 |
| Saturated solution polyoxypropylene-polyoxyethylene 35–8 | 39.2 |
| Saturated solution polyoxypropylene-polyoxyethylene 35–4 | 40.5 |
| Saturated solution polyoxypropylene glycol 1200 | 42.5 |
| Saturated solution polyoxypropylene glycol 2725 | 44 |
| Saturated solution diglycolic ester polyoxypropylene glycol of Example XIX | 48 |

It will be observed that the three Carbowax materials are unsuitable for use as a synergizing component in the practice of the invention because they are too hydrophilic to produce a suitable amount of surface tension reduction. All of the other materials listed produce a reduction in surface tension of at least 25 dynes per square centimeter.

It will be understood that the invention is subject to some variation and modification in the manner of its practical application.

As previously indicated, the type of amine employed in neutralizing the sulfonic acid can be varied. For example, instead of employing butylamine or another primary monoamine, the primary aralkyl amines such as benzylamine or the primary cycloalkylamines such as cyclohexylamine or cyclopentylamine can be employed. Other amines containing reactive hydrogen atoms can be used such as the secondary amines, e.g., dimethylamine, diethylamine, diisopropylamine, dibutylamine, dicyclohexylamine, and dibenzylamine. The amine can contain a hydroxy substituent as in monoethanolamine, diethanolamine, monopropanolamine and dipropanolamine. The amine can also be a polyamine, e.g., ethylenediamine, diethylenetriamine, triethylenetetramine, tetraethylenepentamine, dipropylenetriamine and alkylolamines such as ethanolamines polymerized in the presence of an acidic condensation catalyst (e.g., zinc chloride), with or without substantial removal of water. The oil soluble-water insoluble amines are preferably employed because they increase the oil solubility of the resultant product. The products of the invention are preferably predominantly oil soluble. The expression "predominantly oil soluble"

is used herein to describe products that have better oil solubility than water solubility.

Although it is preferred to use SO₂ extract as the hydrophobic liquid solvent, other suitable hydrocarbon vehicles are toluene, xylene, gas oil, diesel fuel, bunker fuel and coal tar solvents. The solvents employed in preparing the acido-aryl alkane salt are adaptable to azeotropic distillation. Such solvents are immiscible with water, miscible with the reaction mixtures and have a boiling point or boiling range in excess of the boiling point of water.

The compositions of the invention are substantially neutral, non-corrosive and hence easy and safe to handle. They have a very low freezing point which makes storage easier, particularly in the winter. Their oil solubility assures a more even distribution of the active chemical in all parts of an oil or gas well formation to which they are added. They impart a very low interfacial tension to oil-water systems thereby permitting a more efficient removal of water from oil bearing formations. They are particularly effective in the chemical treatment of oil bearing formations to increase oil production where interstitial water or emulsions exist.

The fact that the oil soluble acido-aryl alkane salt is substantially neutral is of particular importance in the case of the sulfo aryl alkane compounds because the polyether linkages of the synergizing component are unstable in the presence of free sulfonic acids. If the acido group were carboxyl or hydroxyl (e.g., attached to an aromatic nucleus) the same tendency to destroy the polyether linkages would not be present but the synergizing component is not ordinarily sufficiently hydrophilic to produce the desired hydrophobe-hydrophile balance.

The compositions of the invention when added to a non-aqueous hydrophobic organic solvent such as benzene, toluene, unleaded gasoline, kerosene, naphtha, gas oil, fuel oil, diesel oil, bunker oil or other non-aqueous hydrophobic organic solvents and then employed for the rinsing of surfaces will remove traces of water or other hydrophilic contaminants by replacing the water film with a film of the hydrophobic substance. When a rinse of this type is poured off, the surface is left in a condition such that any hydrophobic material placed in contact with it will readily wet it and there will not even be a trace of water present at the contact surface. In this way, oil drums used to carry lubricating and fuel oils can readily be cleaned. Likewise, metallic parts which are often reduced to precisely finished shapes by machine tools while the temperature is kept down by a water containing coolant, can readily be cleaned and the water removed so as to prevent subsequent rusting. This type of treatment to remove hydrophilic contaminants is effective on many different types of materials including metal, glass, and plastics (e.g., Lucite)

The term "sulfo-aryl alkane salt" is intended to include and cover aryl alkane salts containing a sulfonate group, a sulfate group or both. The term "sulfo-aromatic alkane amine salt" refers to an aromatic compound containing an alkyl substituent in the aromatic nucleus and also containing a sulfonic and/or a sulfuric acid group neutralized with an amine.

The expression "polyether synergizing component capable of accelerating the separation of an aqueous phase from the oil phase of a dispersion of water in oil" means that the synergizing component containing polyether linkages is capable of producing a faster separation of the water and oil phases of a dispersion of water in oil when employed in combination with the acido-aryl alkane salt than the acido-aryl alkane salt alone.

The expression "synergizing component capable of reducing the surface tension by at least 25 dynes per square centimeter" means that a 1% solution of the synergizing component will reduce the surface tension of distilled water at least 25 dynes per square centimeter, or a saturated solution of the synergizing component will reduce the surface tension of distilled water at least 25 dynes per square centimeter if the solubility of the synergizing component in water under the testing conditions is less than 1% by weight of the solution.

The invention is hereby claimed as follows:

1. A surface active modifying reagent comprising an oil soluble amine salt of an alkylated aromatic sulfonic acid and a polyether synergizing component capable of reducing surface tension of water at least 25 dynes per square centimeter and having a molecular weight of at least 1200 attributable to oxyalkylene groups having 2 to 4 carbon atoms, the relative proportion of said salt being from 3 to 20 times by weight of said synergizing component.

2. A surface active modifying reagent comprising an oil soluble amine salt of an alkylated aromatic sulfonic acid and a polyether synergizing component capable of reducing surface tension of water at least 25 dynes per square centimeter and having a molecular weight of at least 1200 attributable to oxyalkylene groups having 2 to 4 carbon atoms which also constitute a major proportion of the molecular weight of the synergizing component, the relative proportion of said salt being from 3 to 20 times by weight of said synergizing component.

3. A surface active modifying reagent comprising an oil soluble amine salt of an alkylated aromatic sulfonic acid and a polyether synergizing component capable of reducing surface tension of water at least 25 dynes per square centimeter and having a molecular weight of at least 1200 attributable to oxypropylene groups, the relative proportion of said salt being from 3 to 20 times by weight of said synergizing component.

4. A surface active modifying reagent comprising an oil soluble amine salt of an alkylated aromatic sulfonic acid and a polyether synergizing component capable of reducing surface tension of water at least 25 dynes per square centimeter and having a molecular weight of about 2000 to about 4000 attributable to oxypropylene groups, the relative proportion of said salt being from 3 to 20 times by weight of said synergizing component.

5. A surface active modifying reagent comprising an oil soluble amine salt of an alkylated aromatic sulfonic acid and an oil soluble polyol capable of reducing surface tension of water at least 25 dynes per square centimeter and having a molecular weight of at least 1200 attributable to oxyalkylene groups containing 2 to 4 carbon atoms, the relative proportion of said salt being from 3 to 20 times by weight of said synergizing component.

6. A surface active modifying reagent comprising an oil soluble amine salt of an alkylated aromatic sulfonic acid and an oil soluble ether of a polyol capable of reducing surface tension of water at least 25 dynes per square centimeter and having a molecular weight of at least 1200 attributable to oxyalkylene groups containing 2 to 4 carbon atoms, the relative proportion of said salt being from 3 to 20 times by weight of said synergizing component.

7. A surface active modifying reagent comprising an oil soluble amine salt of an alkylated aromatic sulfonic acid and an oil soluble ester of a polyol capable of reducing surface tension of water at least 25 dynes per square centimeter and having a molecular weight of at least 1200 attributable to oxyalkylene groups containing 2 to 4 carbon atoms, the relative proportion of said salt being from 3 to 20 times by weight of said synergizing component.

8. A surface active modifying reagent comprising an oil soluble amine salt of an alkylated aromatic sulfonic acid and an oil soluble acidic ester of a polycarboxylic acid and a polyol capable of reducing surface tension of water at least 25 dynes per square centimeter and having a molecular weight of at least 1200 attributable to oxyalkylene groups containing 2 to 4 carbon atoms, the relative proportion of said salt being from 3 to 20 times by weight of said synergizing component.

9. A surface active modifying reagent comprising an oil soluble amine salt of an alkylated aromatic sulfonic acid and an oil soluble synthetic resin capable of reducing surface tension at least 25 dynes per square centimeter and having a molecular weight of at least 1200 attributable to oxyalkylene groups containing 2 to 4 carbon atoms, the relative proportion of said salt being from 3 to 20 times by weight of said synergizing component.

10. A surface active modifying reagent comprising a predominantly oil soluble substantially neutral amine salt of an alkyl aromatic sulfonic acid and an oil soluble polyether synergizing component having a molecular weight within the range of about 2000 to about 4000 attributable to oxypropylene groups and in which oxyalkylene groups constitute a major proportion of the molecular weight of said synergizing component, the relative proportion of said salt being from 3 to 20 times by weight of said synergizing component.

11. A surface active modifying reagent comprising an oil soluble amine salt of an alkylated aromatic sulfonic acid and an oil soluble polyether synergizing component capable of reducing surface tension of water at least 25 dynes per square centimeter and having a molecular weight of at least 1200 attributable to oxyalkylene groups having 2 to 4 carbon atoms which also constitute a major proportion of the average molecular weight of the synergizing component, dissolved in a hydrophobic solvent, said salt constituting a predominating proportion of said reagent exclusive of said solvent, the relative proportion of said salt being from 3 to 20 times by weight of said synergizing component.

12. A surface active modifying reagent comprising a predominantly oil soluble substantially neutral salt of an amine from the group consisting of primary and secondary aliphatic amines, aralkyl amines and cycloalkyl amines, and an alkyl naphthalene sulfonic acid containing 1 to 5 alkyl groups attached to the naphthalene nucleus, each alkyl group containing at least 3 carbon atoms and not more than 9 carbon atoms, and an oil soluble polyether synergizing component capable of reducing surface tension of water at least 25 dynes per square centimeter and having a molecular weight of about 2000 to about 4000 attributable to oxypropylene groups and in which oxyalkylene groups constitute a major proportion of the molecular weight of the synergizing component, said salt and said synergizing component being dissolved in a hydrophobic solvent and the proportion of said salt being from 3 to 20 times by weight of the amount of the synergizing component.

13. The method of conditioning surfaces containing contaminating water which comprises bringing into contact with said surfaces a hydrophobic solvent containing dissolved therein an oil soluble amine salt of an alkylated aromatic sulfonic acid and an oil soluble polyether synergizing component capable of reducing surface tension of water at least 25 dynes per square centimeter and having a molecular weight of at least 1200 attributable to oxyalkylene groups having 2 to 4 carbon atoms, the relative proportion of said salt being from 3 to 20 times by weight of said synergizing component.

14. The method of conditioning surfaces containing contaminating water which comprises bringing into contact with said surfaces a hydrophobic solvent containing dissolved therein an oil soluble amine salt of an alkylated aromatic sulfonic acid and an oil soluble polyether synergizing component capable of reducing surface tension of water at least 25 dynes per square centimeter and having a molecular weight of about 2000 to 4000 attributable to oxypropylene groups and in which oxyalkylene groups constitute a major proportion of the molecular weight of the synergizing component, the relative proportion of said salt being from 3 to 20 times by weight of said synergizing component.

15. The method of conditioning surfaces containing contaminating water which comprises bringing into contact with said surfaces an oil soluble amine salt of an alkylated aromatic sulfonic acid and a polyether synergizing component capable of reducing surface tension of water at least 25 dynes per square centimeter and having a molecular weight of at least 1200 attributable to oxypropylene groups, the relative proportion of said salt being from 3 to 20 times by weight of said synergizing component.

16. The method of conditioning surfaces containing contaminating water which comprises bringing into contact with said surfaces an oil soluble amine salt of an alkylated aromatic sulfonic acid and a polyether synergizing component capable of reducing surface tension of water at least 25 dynes per square centimeter and having a molecular weight of about 2000 to about 4000 attributable to oxypropylene groups, the relative proportion of said salt being from 3 to 20 times by weight of said synergizing component.

17. A process of increasing the production of oil and gas wells which comprises bringing into contact with the producing formation a well conditioning fluid comprising a solution in an organic hydrophobic liquid of an oil soluble sulfonated alkyl naphthalene salt of an amine from the group consisting of primary and secondary aliphatic amines, primary and secondary aralkyl amines and primary and secondary cycloalkyl amines and an aliphatic polyether polyol synergizing component capable of reducing surface tension of water at least 25 dynes per square centimeter and having a molecular weight of at least 1200 attributable to oxyalkylene groups having 2 to 4 carbon atoms, and thereafter producing from said formation, the relative proportion of said salt being from 3 to 20 times by weight of said synergizing component.

18. A process as claimed in claim 17 in which said well conditioning fluid is introduced into the producing formation and thereafter a hydraulic fracturing fluid is introduced into the formation.

19. A process as claimed in claim 17 in which a hydraulic fracturing fluid is introduced into the formation prior to the introduction of said well conditioning fluid.

20. A process as claimed in claim 17 in which said well conditioning fluid is introduced into the formation after acidizing the well.

21. A process as claimed in claim 17 in which the well is completed with an oil base drilling fluid, followed by treatment with an acid, said well conditioning fluid is thereafter introduced into the formation followed by a hydraulic fracturing fluid.

22. A process as claimed in claim 17 in which said well conditioning fluid is brought into contact with the producing formation and the well is thereafter subjected to an oil-cement squeeze.

23. A process of increasing the production of oil and gas wells which comprises bringing into contact with the producing formation a well conditioning fluid comprising a solution in an organic hydrophobic liquid of an oil soluble sulfonated alkyl naphthalene salt of an alkyl amine and an aliphatic polyether polyol synergizing component capable of reducing surface tension of water at least 25 dynes per square centimeter and having a molecular weight of at least 1200 attributable to oxyalkylene groups having 2 to 4 carbon atoms which also constitute a major proportion of the molecular weight of the synergizing component, and thereafter producing from said formation, the relative proportion of said salt being from 3 to 20 times by weight of said synergizing component.

24. A process of increasing the production of oil and gas wells which comprises bringing into contact with the producing formation a well conditioning fluid comprising a solution in an organic hydrophobic liquid of an oil soluble sulfonated alkyl naphthalene salt of an alkyl amine containing 1 to 5 alkyl groups attached to the aromatic nucleus, each alkyl group containing not more than 9 carbon atoms, an aliphatic polyether polyol synergizing component having a molecular weight in excess of 1200 attributable to oxypropylene groups and in which oxyalkylene groups constitute a major porportion of the molecular weight, and thereafter producing from said formation, the relative proportion of said salt being from 3 to 20 times by weight of said synergizing component.

25. A process of increasing the production of oil and gas wells which comprises bringing into contact with the producing formation a well conditioning fluid comprising a solution in an organic hydrophobic liquid of an oil soluble substantially neutral alkyl amine salt of an alkyl naphthalene sulfonic acid containing not more than 9 carbon atoms per alkyl group, and an aliphatic polyether polyol synergizing component having a molecular weight within the range of 1500 to 8500, at least 1200 of which is attributable to oxypropylene groups and in which oxyalkylene groups containing 2 to 4 carbon atoms constitute a major proportion of said molecular weight, and thereafter producing from said formation, the relative proportion of said salt being from 3 to 20 times by weight of said synergizing component.

26. A process of increasing the production of oil and gas wells which comprises bringing into contact with the producing formation a well conditioning fluid comprising a solution in an organic hydrophobic liquid of a predominantly oil soluble sulfonated alkyl naphthalene alkyl amine salt and an aliphatic polyether polyol synergizing component which has a molecular weight of about 2000 to about 4000 attributable to oxypropylene groups and in which the major proportion of the average molecular weight is attributable to oxyalkylene groups containing 2 to 4 carbon atoms, and thereafter producing from said formation, the relative proportion of said salt being from 3 to 20 times by weight of said synergizing component.

27. A process of increasing the production of oil and gas wells which comprises bringing into contact with the producing formation a well conditioning fluid comprising a solution in an organic hydrophobic liquid of an oil soluble substantially neutral salt of an amine from the group consisting of primary and secondary aliphatic amines, primary and secondary aralkyl amines and primary and secondary cycloalkyl amines, and an alkyl naphthalene sulfonic acid containing 1 to 5 alkyl groups attached to the naphthalene nucleus, each alkyl group containing at least 3 carbon atoms and not more than 9 carbon atoms, and an aliphatic polyether polyol synergizing component having a molecular weight within the range from 1500 to 8500 of which at least 1200 is attributable to oxypropylene groups and in which oxyalkylene groups containing 2 to 4 carbon atoms constitute a major proportion of the average molecular weight, and thereafter producing from said formation, the relative proportion of said salt being from 3 to 20 times by weight of said synergizing component.

28. A process of increasing the production of oil and gas wells which comprises bringing into contact with the producing formation a well conditioning fluid comprising a solution in an organic hydrophobic liquid of an oil soluble substantially neutral alkyl amine salt of an alkyl naphthalene sulfonic acid containing not more than 9 carbon atoms per alkyl group attached to the naphthalene nucleus, and an aliphatic polyether polyol synergizing component having a molecular weight within the range of 1500 to 8500 and composed of a long polyoxypropylene chain having a molecular weight of at least 1200 attributable to oxypropylene groups, terminal portions of said chain being composed of oxyethylene groups, and thereafter producing from said formation, the relative proportion of said salt being from 3 to 20 times by weight of said synergizing component.

29. A process of increasing the production of oil and gas wells which comprises bringing into contact with the producing formation a well conditioning fluid comprising a solution in an organic hydrophobic liquid of a predominantly oil soluble substantially neutral butylamine salt of an alkyl naphthalene sulfonic acid which is substantially monosulfonated in the naphthalene nucleus and contains a minimum of at least 15% by weight monoamyl naphthalene sulfonic acid, and an aliphatic polyol synergizing component which is an oxyethylated polyoxypropylene glycol derived by the addition of 4 to 12 moles of ethylene oxide per mole of a polyoxypropylene glycol having a molecular weight within the range from 2000 to about 4000, and thereafter producing from said formation, the relative proportion of said salt being from 3 to 20 times by weight of said synergizing component.

30. A process of increasing the production of oil and gas wells which comprises bringing into contact with the producing formation a well conditioning fluid comprising a solution in an organic hydrophobic liquid of a predominantly oil soluble substantially neutral butylamine salt of an alkyl naphthalene sulfonic acid containing 1 to 5 alkyl groups attached to the naphthalene nucleus, each alkyl group containing at least 3 carbon atoms and not more than 9 carbon atoms, and the total number of carbon atoms in said alkyl groups not exceeding 18, and an aliphatic polyether polyol synergizing component which is an oxyethylated polyoxypropylene glycol derived by the addition of 4 to 8 moles of ethylene oxide to 1 mole of a polyoxypropylene glycol resulting from the condensation of approximately 35 moles of 1,2-propylene oxide, and thereafter producing from said formation, the relative proportion of said salt being from 3 to 20 times by weight of said synergizing component.

31. A process of increasing the production of oil and gas wells which comprises bringing into contact with the producing formation a well conditioning fluid comprising a solution in an organic hydrophobic liquid of a predominantly oil soluble substantially neutral butylamine salt of an alkyl naphthalene sulfonic acid substantially monosulfonated in the naphthalene nucleus and containing a minimum of at least 15% by weight of monoamyl naphthalene sulfonic acid, and a synergizing component which is an oxyethylated polyoxypropylene glycol derived by the addition of 4 to 8 moles of ethylene oxide to 1 mole of a polyoxypropylene glycol resulting from the condensation of approximately 35 moles of 1,2-propylene oxide, and thereafter producing from said formation, the relative proportion of said salt being from 3 to 20 times by weight of said synergizing component.

32. A well conditioning fluid comprising an oil soluble sulfonated alkyl naphthalene salt of an amine from the group consisting of primary and secondary aliphatic amines, primary and secondary aralkyl amines and primary and secondary cycloalkyl amines and an aliphatic polyether polyol synergizing component capable of reducing surface tension of water at least 25 dynes per square centimeter and having a molecular weight of at least 1200 attributable to oxyalkylene groups having 2 to 4 carbon atoms, dissolved in a hydrophobic solvent, said salt constituting from 3 to 20 times by weight of said synergizing component.

33. A well conditioning fluid comprising an oil soluble sulfonated alkyl naphthalene alkyl amine salt and an aliphatic polyether polyol synergizing component which is characterized by a long chain composed of oxypropylene groups and terminal chains of oxyethylene groups, said polyether polyol having a molecular weight within the range from about 1500 to about 8500 of which 2000 to 4000 is attributable to oxypropylene groups, exclusive of terminal hydroxyl groups, the said salt and said synergizing component being dissolved in a hydrophobic solvent, the proportion of said salt being from 3 to 20 times by weight of said synergizing component.

34. A process of increasing the production of oil and gas wells which comprises bringing into contact with the producing formation a well conditioning fluid consisting essentially of an oil soluble sulfonated alkyl naphthalene salt of an oil soluble alkyl amine and a polyether polyol synergizing component which is characterized by a single long chain composed of oxypropylene groups and terminal chains of oxyethylene groups, said polyether polyol having a molecular weight within the range from about 1500 to about 8500 of which 2000 to 4000 is attributable to oxypropylene groups, the said salt and said synergizing component being dissolved in a hydrophobic hydrocarbon solvent, the proportion of said salt being from 3 to 20 times by weight of said synergizing component, allowing the said well treating fluid to remain in contact with said formation for a substantial period of time, and thereafter producing from said formation, the quantity of said oil soluble sulfonated alkyl naphthalene amine salt and said polyether polyol synergizing component dispersed in said hydrophobic solvent being sufficient to increase the production from said formation.

35. A process of conditioning solid surfaces containing oil and water which comprises bringing into contact with said surfaces a hydrophobic solvent containing dissolved therein an oil soluble amine salt of an alkylated aromatic sulfonic acid and a polyether synergizing component capable of reducing surface tension of water at least 25 dynes per square centimeter and having a molecular weight of at least 1200 attributable to oxyalkylene groups having 2 to 4 carbon atoms, said polyether synergizing component being an oil soluble polyoxyethylated hydrophobic organic material having a reactive hydrogen atom, the amount of ethylene oxide used in oxyethylating said organic material being within the range of approximately 2/3 part to 2 parts by weight of ethylene oxide per part by weight of said organic material, and the relative proportion of said amine salt being from 3 to 20 times by weight of said synergizing component.

36. A process as claimed in claim 35 in which the polyether synergizing component is an addition product of ethylene oxide and an oil soluble alkylated phenol-formaldehyde condensation product.

37. A process as claimed in claim 35 in which the polyether synergizing component is an addition product of ethylene oxide and a fatty oil.

38. A process of increasing the production of oil and gas wells which comprises bringing into contact with the producing formation a well conditioning fluid comprising a hydrophobic solvent containing dissolved therein an oil soluble non-aromatic amine salt of an alkylated aromatic sulfonic acid and an oil soluble polyether synergizing component capable of reducing surface tension of water at least 25 dynes per square centimeter, said polyether synergizing component being an oil soluble polyoxyethylated hydrophobic organic material having a reactive hydrogen atom wherein the average molecular weight is at least 1200 and in which there is approximately 2/3 part by weight to 2 parts by weight of ethylene oxide per part by weight of hydrophobic organic material which is oxyethylated, the weight of said oil soluble amine salt being within the range of 3 to 20 times the weight of said oil soluble polyether synergizing component.

39. A solid surface conditioning composition comprising a hydrophobic solvent containing dissolved therein an oil soluble non-aromatic amine salt of an alkylated aromatic sulfonic acid and an oil soluble polyether synergizing component capable of reducing surface tension of water at least 25 dynes per square centimeter, said polyether synergizing component being an oil soluble polyoxyethylated hydrophobic organic material having a reactive hydrogen atom wherein the average molecular weight is at least 1200 in which approximately 2/3 part by weight to 2 parts by weight of ethylene oxide is reacted per part by weight of said organic material which is oxyethylated, and the weight of said oil soluble amine salt is 3 to 20 times the weight of said polyether synergizing component.

40. A composition as claimed in claim 39 wherein said polyether synergizing component is an addition product of ethylene oxide and an oil soluble alkyl phenol-formaldehyde resin.

41. A composition as claimed in claim 39 in which said polyether synergizing component is an oxyethylated alkyl phenol-formaldehyde resin in which the weight ratio of ethylene oxide to said resin is approximately within the range 1:1 to 2:1.

42. A composition as claimed in claim 39 in which said polyether synergizing component is an addition product of ethylene oxide and a fatty oil.

43. A composition as claimed in claim 39 in which said polyether synergizing component is oxyethylated castor oil made by the oxyethylation of castor oil with 15 to 45 moles of ethylene oxide per mole of castor oil.

References Cited in the file of this patent

UNITED STATES PATENTS

| | | |
|---|---|---|
| 2,164,459 | Kennedy | July 4, 1939 |
| 2,331,594 | Blair | Oct. 12, 1943 |
| 2,341,500 | Detling | Feb. 8, 1944 |
| 2,342,106 | Jones et al. | Feb. 22, 1944 |
| 2,447,475 | Kaberg et al. | Aug. 17, 1948 |
| 2,509,233 | Kaberg et al. | May 30, 1950 |
| 2,558,512 | De Groote et al. | June 26, 1951 |
| 2,568,116 | De Groote et al. | Sept. 18, 1951 |
| 2,606,871 | Ten Brink | Aug. 12, 1952 |
| 2,740,814 | Gross et al. | Apr. 3, 1956 |
| 2,800,962 | Garst | July 30, 1957 |

UNITED STATES PATENT OFFICE

CERTIFICATE OF CORRECTION

Patent No. 2,946,747                          July 26, 1960

Willard H. Kirkpatrick et al.

It is hereby certified that error appears in the printed specification of the above numbered patent requiring correction and that the said Letters Patent should read as corrected below.

Column 4, line 20, for "acd" read -- acid --; line 44, for "wieght" read -- weight --; column 17, line 2, after "surface tension" insert -- of water --.

Signed and sealed this 11th day of April 1961.

(SEAL)
Attest:
ERNEST W. SWIDER                      ARTHUR W. CROCKER

Attesting Officer                        Acting Commissioner of Patents